United States Patent [19]

Dijkstra

[11] Patent Number: 5,047,780
[45] Date of Patent: Sep. 10, 1991

[54] PULSE RADAR APPARATUS AND PULSE DISCRIMINATION CIRCUIT SUITABLE FOR INCORPORATION IN A PULSE RADAR APPARATUS

[75] Inventor: Jan A. Dijkstra, Almelo, Netherlands

[73] Assignee: Hollandse Signaalapparaten B.V., Hengelo, Netherlands

[21] Appl. No.: 553,023

[22] Filed: Jul. 12, 1990

[30] Foreign Application Priority Data

Jul. 14, 1989 [NL] Netherlands .................. 8901826

[51] Int. Cl.$^5$ .................................. G01S 13/08
[52] U.S. Cl. .............................. 342/145; 342/91
[58] Field of Search ............. 342/145, 94, 93, 91; 375/96

[56] References Cited

U.S. PATENT DOCUMENTS

| | | | |
|---|---|---|---|
| 3,668,702 | 6/1972 | Jones | 342/91 |
| 3,973,260 | 8/1976 | Costantini et al. | 342/91 |
| 4,293,856 | 10/1981 | Chressanthis et al. | 342/93 |
| 4,581,767 | 4/1986 | Monsen | 342/17 |
| 4,780,720 | 10/1988 | Watts | 342/91 |

Primary Examiner—Gilberto Barrón, Jr.
Attorney, Agent, or Firm—Robert J. Kraus

[57] ABSTRACT

A pulse radar apparatus is provided with a transmitting unit (4) for the transmission of a modulated transmitter pulse $Y_t$, a mixer (9), an IF amplifier (11) and a quadrature detector (12) for the reception of signals $Y_r$ and the correlation of signals $Y_r$ with a replica X of the emitted modulated transmitter pulse $Y_t$, to obtain an in time compressed correlation signal $\sigma_{xy}(\delta)$. The pulse radar apparatus is also provided with a pulse discriminator (3) to enable, on the basis of at least one amplitude $|Y_r|$ of the received signal $Y_r$ and at least one amplitude $|\sigma_{xy}(\delta)|$ of the correlation signal $\sigma_{xy}(\delta)$, differentiation between the signals $Y_r$, possessing modulation, and interference.

15 Claims, 3 Drawing Sheets

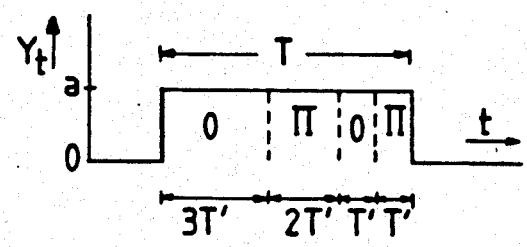
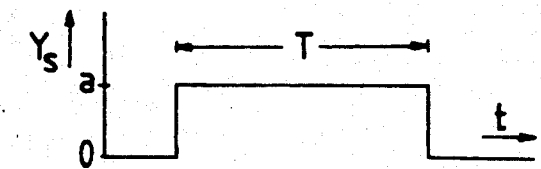
Fig. 2a　　　　　Fig. 2b
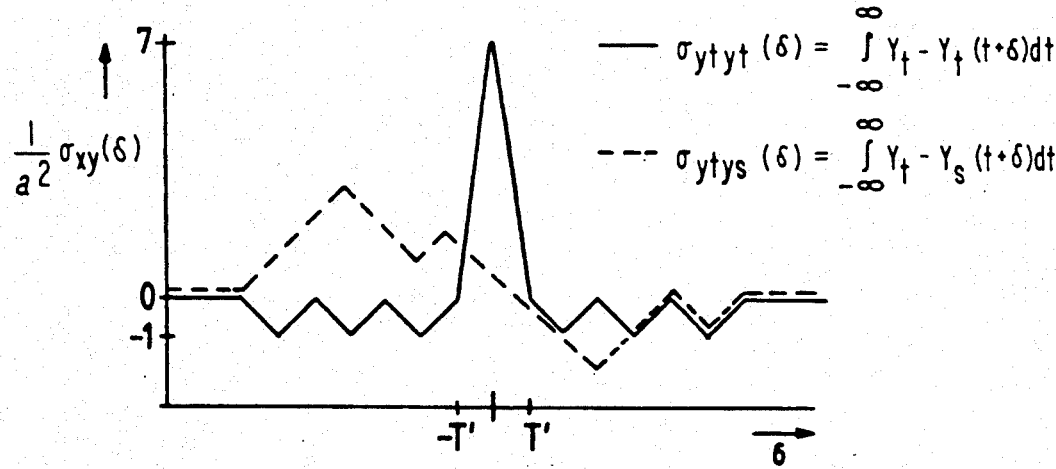
Fig. 3

PULSE RADAR APPARATUS AND PULSE DISCRIMINATION CIRCUIT SUITABLE FOR INCORPORATION IN A PULSE RADAR APPARATUS

BACKGROUND OF THE INVENTION

The invention relates to a pulse radar apparatus, provided with a transmitting and receiving unit (transmitter and receiver) for the generation and the transmission of a modulated radar transmitter pulse $Y_t$, for the reception of the signals $Y_r$ and the correlation of a signal $Y_r$ with a replica X of the emitted radar transmitter pulse $Y_t$ to obtain an in time $\delta$ compressed correlation signal $\sigma_{xy}(\delta)$ The invention also relates to a pulse discriminator suitable for application in such a pulse radar apparatus.

A known embodiment of such a pulse radar apparatus relates to a pulse radar apparatus provided with a pulse compression filter for the compression in time of the received radar signal $Y_r$, so that a more accurate range determination can be obtained than would have been obtained on the basis of the uncompressed received signals $Y_r$. A carrier wave of the emitted radar transmitter pulse $Y_t$ can be modulated in frequency, phase or amplitude, the correlation of the received radar signal can be realised by a matched filter, whose frequency response corresponds to a replica X of the radar transmitter pulse. The correlation can also be established with the aid of a replica X of the radar transmitter pulse $Y_t$. In both cases, upon reception of the radar signal $Y_r$, a sharply peaked signal $\sigma_{xy}(\delta)$ in time $\delta$ is obtained, having a larger amplitude than would have been obtained without compression.

A problem with pulse radar systems is their susceptability to interference signals, whether or not caused intentionally. If a pulse radar apparatus, provided with a pulse compression filter receives an interference signal which does not contain the modulation information, a sharply peaked signal $\sigma_{xy}(\delta)$ will not be obtained. Nevertheless, the received interference signal, after correlation performed with the aid of the pulse compression filter, will still have a relatively large amplitude, if the amplitude of the interference signal is large. This amplitude can even be that large that the interference signal is not classified as such.

SUMMARY OF THE INVENTION

The pulse radar apparatus according to the invention solves this problem and is characterised in that the transmitting and receiving unit are provided with a pulse dicriminator to, on the basis of at least one amplitude $|Y_r|$ of the received signal $Y_r$ and at least one amplitude $|\sigma_{xy}(\delta)|$ of the correlation signal $\sigma_{xy}(\delta)$, enable differentiation between the signals $Y_r$ possessing modulation information to a degree which differs from signal to signal.

By comparing the amplitudes of the received signal before correlation with amplitudes of the signal after correlation, a distinction can be made between interference signals without and echo signals with the modulation information, on the basis of an a priori relation of amplitudes with signals provided with above modulation information. In this manner a pulse radar apparatus provided with a pulse compression filter can be made insusceptible to interference signals of great amplitude in a cost-effective way.

Another embodiment is characterised in that the pulse discriminator, on the basis of at least one amplitude $|Y_r|$ and at least one amplitude $|\sigma_{xy}(\delta)|$ generates a signal P as a function of the extent of the above modulation information contained in the received signal $Y_r$.

Here, signal P can be equal to the relation $$\frac{|\sigma_{xy}(\delta)|}{f(|Y_r|)}$$

where $f(|Y_r|)$ is a function of $|Y_r|$.

The pulse discriminator shall preferably comprise a comparator for the generation of a control signal S when signal P at $\delta=0$ is smaller than a preset value PC, and comprises an attenuator to attenuate or block the correlation signal $\sigma_{xy}(\delta)$ to be supplied to the signal processor, on the basis of the control signal S to be supplied to the attenuator.

The maximum signal gain, arising as a result of the compression, by a pulse compression filter, of a signal containing specific modulation information, is supplied in advance by the so-called pulse compression gain factor. By comparing the relation of the peak values with the pulse compression gain factor, it can be simply determined whether this gain is actually obtained and also whether the signal supplied to the filter contains the correct modulation information. In case of an echo pulse containing the correct modulation information, the peak value of the correlation signal is situated at $\delta=0$. Subsequently, the attenuator can, on the basis of the control signal, attenuate or even block signals, not containing this information.

Here the pulse discriminator can comprise a delay unit for delaying the correlation signal $\sigma_{xy}(\delta)$, to be applied to the attenuator, where the control signal S and the correlation signal $\sigma_{xy}(\delta)$ are simultaneously applied to the attenuator. This has the advantage that the signals S and $\sigma_{xy}(\delta)$ are synchronised in time.

According to an alternative embodiment, the pulse discriminator comprises normalising means for generating and applying the signal P to a signal processor. The large amplitude difference between signals P with the correct modulation information and signals P without this information can be used in the signal processor as the basis for deciding if a signal needs to be suppressed. Because now an interference signal is not unconditionally blocked, echo signals, which in time are close to the interference signal, will not be blocked anymore.

A further embodiment of a pulse radar apparatus, equipped with analogue/digital convertors for obtaining digitised values of $Y_r$ and $\sigma_{xy}(\delta)$ is realised with a pulse discriminator, provided with a shift register for the storage, for at least a time T, of the amplitudes $|Y_r|$ supplied to the shift register, whereby T is equal to the duration of the emitted modulated radar transmitter pulse $Y_t$, and provided with a peak detector for the determination of $f(|Y_r|)$ of the amplitudes of $|Y_r|$, stored in the shift register.

This offers the advantage that, on the basis of the contents of the shift register, a maximum amplitude in a period of time, whose length equals the emitted pulse can be determined in a simple manner.

BRIEF DESCRIPTION OF THE DRAWINGS

The invention will now be described in more detail with reference to the accompanying figures, of which:

FIGS. 2a and 2b represent a phase-modulated radar transmitter pulse $Y_t$ and a non-modulated signal $Y_s$, respectively;

FIG. 3 represents the correlation signals $\sigma_{xy}(\delta)$, obtained from the pulse compression filter of the signals mentioned in FIG. 2 with a replica X of the radar transmitter pulse $Y_t$, shown in FIG. 2;

DESCRIPTION OF THE PREFERRED EMBODIMENTS

Figure 1:
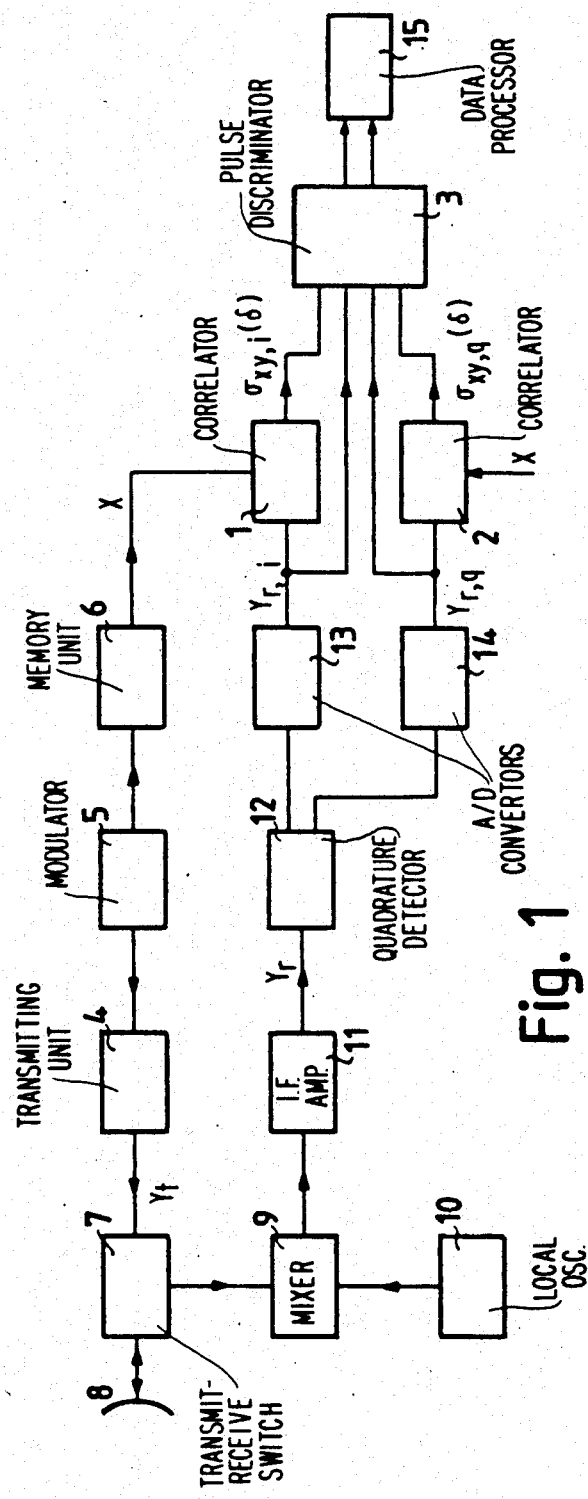
FIG. 1 represents a simplified diagram of a pulse radar apparatus with a pulse compression filter, using a pulse discriminator according to the invention.

FIG. 1 represents a simplified diagram of a pulse radar apparatus with the correlators 1 and 2 arranged as pulse compression filters and a pulse discriminator 3 according to the invention. The application of the pulse discriminator is however not limited to the described version of a pulse radar apparatus. Every pulse radar apparatus equipped with pulse compression means is in principle suitable. Moreover, the pulse discriminator can also be applied in a sonar system equipped with pulse compression means. The invention is not limited to specific implementations of pulse compression as for instance linear or non-linear frequency modulation, bi-phase or multi-phase modulation and amplitude modulation.

In FIG. 1 a radar transmitter 4 is shown for the generation of a radar transmitter pulse $Y_t$ with a RF carrier frequency, whereby the radar transmitter pulse is modulated by a modulator 5. A replica X of the modulated radar transmitter pulse $Y_t$ is stored in a memory unit 6 for the correlators 1 and 2. The memory unit 6 is not required to be explicitly incorporated in versions of a pulse compression filter, whose replica X is implicitly stored, owing to the frequency conversion characteristics of the filter, as for instance with a dispersive delay line. Via a transmit-receive switch 7, the radar transmitter pulse $Y_t$ is emitted by an antenna 8. An echo signal $Y_r$ received by the antenna 8, or possibly an interference signal $Y_s$ is converted to an intermediate frequency by a mixer 9 and a local oscillator 10. Upon amplification by an IF-amplifier 11 and phase detection by a quadrature detector 12, the in-phase signal $Y_{r,i}$ and the out-of-phase signal $Y_{r,q}$, are, upon digitisation by the analogue-to-digital convertors 13 and 14, fed to the correlators 1 and 2 and to the pulse discriminator 3. The signals $Y_{r,i}$ and $Y_{r,q}$ are correlated with the replica X of the radar transmitter pulse. The correlation signals $\sigma_{xy,i}(\delta)$ and $\sigma_{xy,q}(\delta)$, obtained after correlation of $Y_{r,i}$ with X and $Y_{r,q}$ with X, respectively, are also fed to the pulse discriminator 3. The correlation signals represent a pulse, compressed in time, having a length, characteristic for a radar transmitter pulse, of for instance 0.6 μs at an uncompressed pulse length of 10 μs. The pulse discriminator 3 is connected to a data-processor 15, which may comprise a plot extractor, Doppler analysis means and display means.

It is noted that instead of two actual correlators for both the in-phase and the out-of-phase signal, it is also possible to employ a single complex correlator.

FIG. 2a represents an example of a phase-modulated radar transmitter pulse $Y_t$, of which the carrier wave shows phase jumps of 0 and $\pi$ radians (bi-phase modulation) in segments with lengths of multiples of T'.

FIG. 2b represents an example of an interference signal $Y_s$ with equal length and amplitude, but without modulation.

Correlation of $Y_t$, in FIG. 2a with itself (autocorrelation) according to the convolution integral $$\sigma_{yty_t}(\delta) = \int_{-\infty}^{\infty} Y_t \cdot Y_t(t + \delta)dt$$

yields a correlation signal, as shown in full line in FIG. 3. Correlation of $Y_s$ in FIG. 2b with $Y_t$ (cross correlation) according to the convolution integral $$\sigma_{yty_s}(\delta) = \int_{-\infty}^{\infty} Y_t \cdot Y_s(t + \delta)dt$$

yields a correlation signal, as shown in broken line in FIG. 3.

Under certain conditions the following applies:

$$\left| \frac{\sigma_{yty_t}(0)}{\sigma_{yty_t}(k \cdot T)} \right| \geq N$$

with k=1, 2, 3, . . . and N=T/T', (here N=7).

In case of autocorrelation, a maximum amplitude occurs at $\delta=0$. In general, the modulation will be such that the side bands of the correlation signal are minimal with respect to the maximum peak. With signals with a different modulation or no modulation at all, the correlation signal will show a less sharp peak. The maximum amplitude of the correlation signal for the non-modulated signal $Y_s$ will, also in case of longer or shorter pulse lengths, not exceed the maximum number of contiguous intervals having the same phase shift (in this case 3) in $Y_t$. When the replica X, related to the signal $Y_t$ has a pulse amplitude "a" and the received signal $Y_r$ has an amplitude "b", the correlation signal after normalisation is as follows:

$$\frac{\sigma_{xy}(\delta)}{a \cdot b}$$

A suitable criterion for modulated or non-modulated echo signals is the amplitude ratio:

$$\frac{|\sigma_{xy}(0)|}{b} \quad \text{or:} \quad \log|\sigma_{xy}(0)| - \log(b).$$

This criterion is hardly or not at all dependent of the strength b of the received signal $Y_r$, in that $|\sigma_{xy}(0)|$ is also a function of b. Consequently, also strong, unmodulated interference signals can be distinguished from weak, coded echo signals. In case of bi-phase modulation, a pulse compression-gain factor of 3 dB is attainable, with multi-phase 10 dB. It should be noted in this context that besides discrimination based on the maximum amplitude $\sigma_{xy}(0)$, discrimination based on the degree of symmetry in the correlation signal signal is also possible (see FIG. 3).

Figure 4:
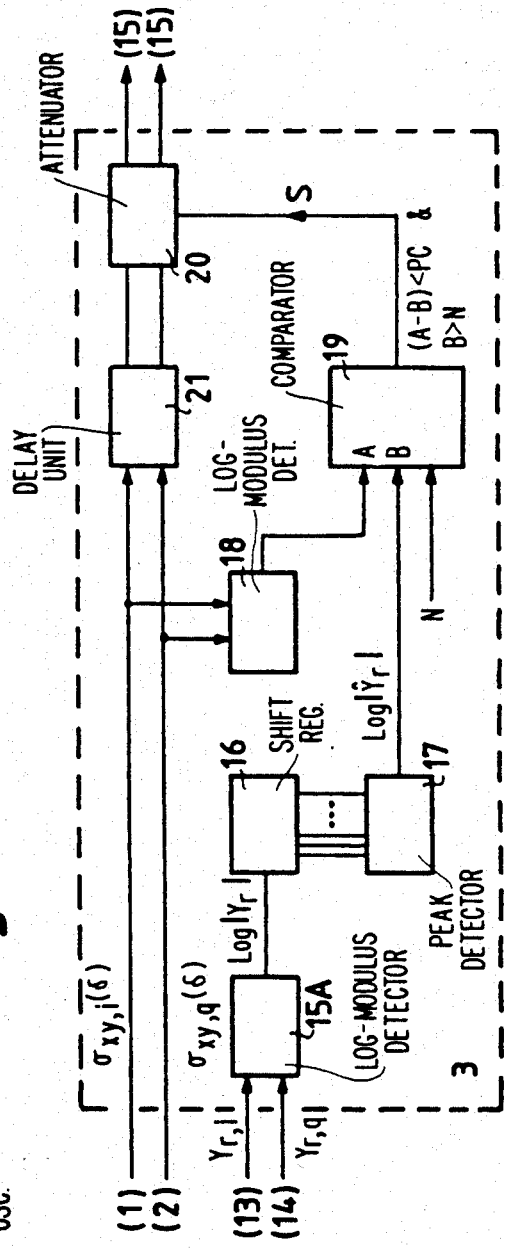
FIG. 4 represents a first embodiment of the pulse discriminator.

FIG. 4 represents a first embodiment of pulse discriminator 3, referred to in FIG. 1. The in-phase signal $Y_{r,i}$ and the out-of-phase signal $Y_{r,q}$, obtained upon quadrature detection, are fed to a log-modulus detector 15A. The logarithm of the modulus ($\log|Y_r|$), determined by this detector, is subsequently stored in a shift register 16. The length of the shift register 16 is such that the supplied values can be stored for a time at least equalling the pulse duration T of an uncompressed pulse.

Since for a modulated pulse, the maximum amplitude of the correlation signal occurs at $\delta=0$, these maximum values are to be compared with a maximum amplitude of the non-compressed signal fed to the shift register 16 during a time T:

$$\log|Y_r(t)| \text{ where } t - \frac{T}{2} \leq t \leq t + \frac{T}{2}.$$

A peak detector 17, connected to the shiftregister 16 determines a maximum amplitude $\log|\hat{Y}_r|$ of the values of $\log|Y_r|$, stored in the shift register and supplies these values to a comparator 19.

It should be noted in this respect, that another suitable version is obtained with a peak detector which does not determine the maximum amplitude $|\hat{Y}_r|$, but a weighted mean $|\overline{Y}_r|$.

The in-phase correlation signal $\sigma_{xy,i}(\delta)$ originating from the correlator 1 and the out-of-phase correlation signal $\sigma_{xy,q}(\delta)$, originating from the correlator 2, are fed to a log-modulus detector 18. The logarithm of the modulus ($\log|\sigma_{xy}(0)|$), determined by this detector is compared by the comparator 19 with the maximum amplitude $\log|\hat{Y}_r|$, determined by the peak detector 17 and with a preset noise threshold value N. The comparator generates a control signal S, if the following relations are met:

$$\log|\sigma_{xy}(0)| - \log|\hat{Y}_r| < PC \text{ and}$$

$$\log|\hat{Y}_r| > N.$$

Here, PC stands for the pulse compression gain factor for a correctly modulated signal, so that the control signal S is generated if the achieved gain is smaller than the pulse compression gain factor PC and the non-compressed signal exceeds the noise threshold N.

The control signal S is fed to an attenuator 20, which in that case blocks the correlation signals, to be fed to the data processor 15, referred to in FIG. 1. A delay unit 21 synchronises the correlation signals and the control signal S to be fed to the attenuator 20.

Figure 5:
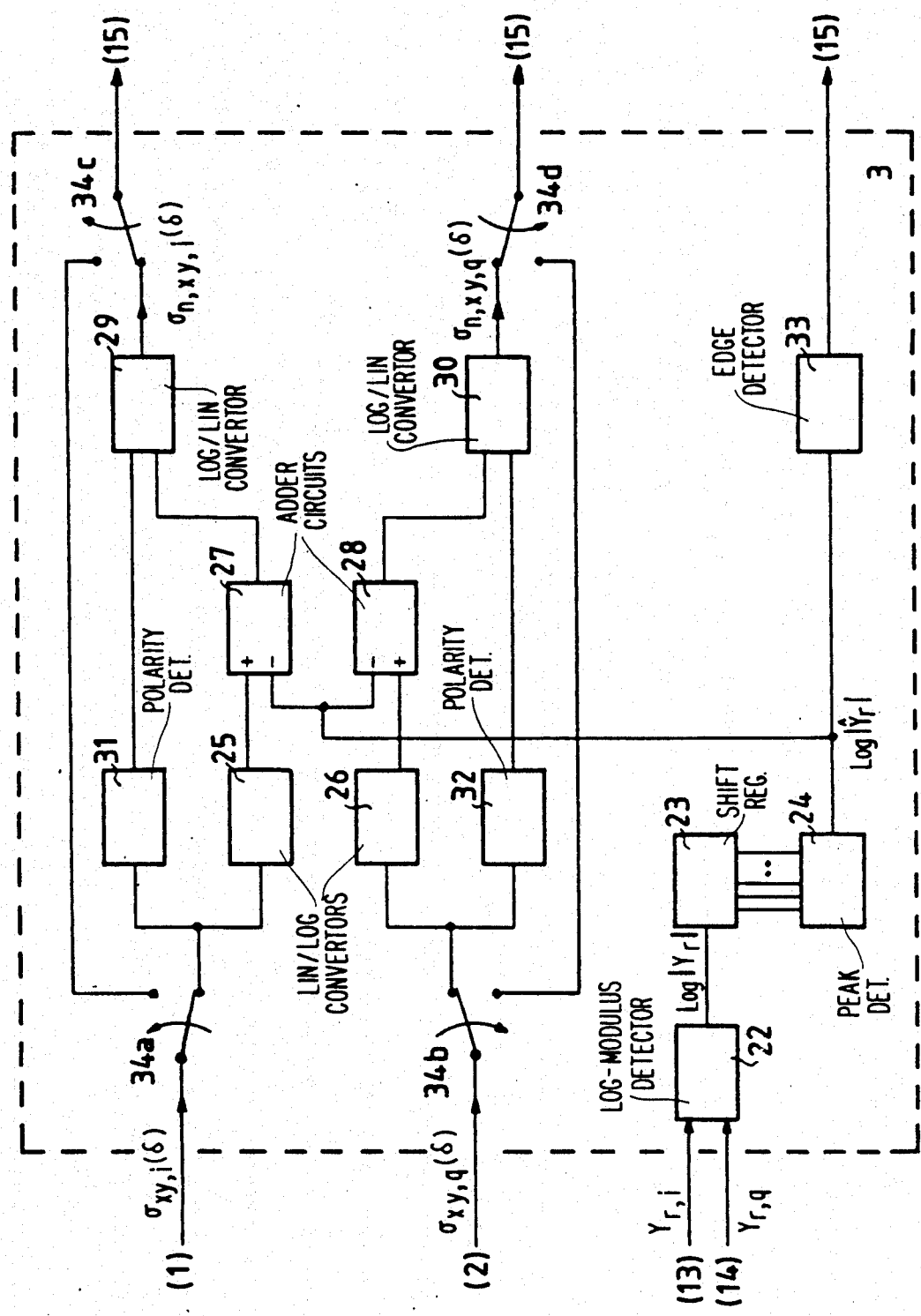
FIG. 5 represents a second embodiment of the pulse discriminator.

FIG. 5 represents a second embodiment of the pulse discriminator 3, referred to in FIG. 1. With this discriminator, the correlation signals $\sigma_{xy,i}(\delta)$ and $\sigma_{xy,q}(\delta)$ are no longer attenuated or interrupted, as is the case with the first embodiment, but correlation signals, originating from an echo signal are amplified with respect to correlation signals, originating from an interference signal. Subsequent signal processing takes place in the signal processor 15. The advantage over the first embodiment is that echo signals, whose time characteristics resemble those of interference signals, are not suppressed as well and that as regards discrimination other criteria can be applied. The circuit is provided with a log-modulus detector 22, a shift register 23 and a peak detector 24 for determining the logarithm of the maximum amplitude of the modulus ($\log|\hat{Y}_r|$ of the non-correlated signals $Y_{r,i}$ and $Y_{r,q}$, as described for the first embodiment, referred to in FIG. 4. In this respect it can be observed that an additional filtering can possibly take place in the peak detector 24. The correlation signals $\sigma_{xy,i}(\delta)$ and $\sigma_{xy,q}(\delta)$ are fed to the lin/log convertors 25 and 26 respectively to obtain their logarithmic values. Subsequently, the logarithmic values are normalised by deducting the value of $\log|\hat{Y}_r|$, obtained from the peak detector using the adder circuits 27 and 28 according to:

$$\log\sigma_{n,xy,i}(\delta) = \log\sigma_{xy,i}(\delta) - \log|\hat{Y}_r| \text{ and}$$

$$\log\sigma_{n,xy,q}(\delta) = \log\sigma_{xy,q}(\delta) - \log|\hat{Y}_r|.$$

By means of the log/lin convertors 29 and 30, the anti-logarithmic values $\sigma_{n,xy,i}(\delta)$ and $\sigma_{n,xy,q}(\delta)$ of the signals, originating from the adder circuits 27 and 28 are determined. The polarity determinators 31 and 32, respectively, perform the correct conversion. As a result, an echo signal with the correct modulation will be additionally amplified, because for this the value of $|Y_r|$, determined by the peak detector will in general be lower than the value of $|Y_r|$ for a strong interference signal lacking the correct modulation. A difference in amplitude of a normalised signal, originating from the echo signal compared to a normalised signal, originating from the interference signal, will in that case be greater than a difference between the amplitudes of the corresponding non-normalised correlation signals.

It should be noted in this respect that instead of the aforementioned circuits 27 and 28, the log/lin convertors 29 and 30 and the lin/log convertors 25 and 26, a fast digital multiplier can also be employed.

An edge detector 33, connected to the peak detector 24, is used for an accurate determination of the distance of a source, generating an interference signal. A first edge of an interference signal enables a more accurate assessment of the distance than is possible on the basis of the centre of the entire pulse.

The pulse discriminator 3 is equipped with switching means 34a–d, which in the indicated position provide the data processor 15 with normalised correlation signals and in the other position, which is not indicated, provide this data processor with non-normalised correlation signals.

I claim:

1. A pulse radar apparatus comprising a transmitting and receiving unit for the generation and transmission of a modulated radar transmitter pulse $Y_t$, for the reception of a signal $Y_r$ and the correlation of the signal $Y_r$ with a replica X of the emitted transmitter pulse $Y_t$ to obtain an in time $\delta$ compressed correlation signal $\sigma_{xy}(\delta)$, characterised in that the transmitting and receiving unit includes a pulse discriminator to, on the basis of at least one amplitude $|Y_r|$ of the received signal $Y_r$ and at least one amplitude $|\sigma_{xy}(\delta)|$, of the correlation signal $\sigma_{xy}(\delta)$, generate a signal P as a function of the extent of the modulation information contained in the received signal $Y_r$.

2. Pulse radar apparatus as claimed in claim 1, characterised in that the signal P is equal to the relation $$\frac{|\sigma_{xy}(\delta)|}{f(|Y_r|)}$$

where $f(|Y_r|)$ is a function of $|Y_r|$.

3. Pulse radar apparatus as claimed in claim 2, characterised in that the function $f(|Y_r|)$ is equal to $|\hat{Y}_r|$, whereby $|\hat{Y}_r|$ is equal the highest value of the amplitudes $|Y_r|$ of the received signal $Y_r$.

4. Pulse radar apparatus as claimed in claim 2, characterised in that the function $f(|Y_r|)$ is equal to $|\overline{Y}_r|$, whereby $|\overline{Y}_r|$ is equal to the mean value of the amplitudes $|Y_r|$ of the received signal $Y_r$.

5. Pulse radar apparatus as claimed in claim 2 or 4, characterised in that the pulse discriminator comprises a comparator for generating a control signal S, in case the signal P at $\delta=0$ is smaller than a preset value PC, and furthermore comprises an attenuator for attenuating or suppressing the correlation signal $\sigma_{xy}(\delta)$ to be fed to the signal processor, on the basis of the control signal S to be fed to the attenuator.

6. Pulse radar apparatus as claimed in claim 5, characterised in that the pulse discriminator comprises a delay unit for delaying the correlation signal $\sigma_{xy}(\delta)$ to be fed to the attenuator, whereby the control signal S and the correlation signal $\sigma_{xy}(\delta)$ are substantially simultaneously fed to the attenuator.

7. Pulse radar apparatus as claimed in claim 5, characterised in that the comparator suppresses the control signal S if $f(|Y_r|)$ is smaller than a preset value N.

8. Pulse radar apparatus as claimed in claim 1, 2, 3 or 4, characterised in that the pulse discriminator comprises a first lin/log circuit for obtaining a logarithmic value of the signal $Y_r$ fed to the pulse discriminator and comprises a second lin/log circuit for obtaining a logarithmic value of the signal $\sigma_{xy}(\delta)$ fed to the pulse discriminator.

9. Pulse radar apparatus as claimed in claims 2, 3 or 4 characterised in that the pulse discriminator comprises normalizing means to generate and feed the signal P to a signal processor.

10. Pulse radar apparatus as claimed in claim 9, characterised in that the normalizing means comprise an adder circuit for subtracting the signals, originating from the first and second lin/log circuit and comprise a log/lin circuit for obtaining an inverse logarithmic value of the signal, originating from the adder circuit.

11. Pulse radar apparatus as claimed in claim 9, characterised in that the pulse radar apparatus is provided with analogue/digital convertors for obtaining digitised values of $Y_r$ and $\sigma_{xy}(\delta)$, and characterised in that the normalizing means comprise a digital multiplier to obtain:

$$\frac{|\sigma_{xy}(\delta)|}{f(|Y_r|)}.$$

12. Pulse radar apparatus as claimed in claim 2, 3 or 4, characterised in that the pulse radar apparatus is provided with analogue/digital convertors for obtaining digitised values of $Y_r$ and $\sigma_{xy}(\delta)$ and that the pulse discriminator is provided with a shift register for the storage of, for at least a time T, the amplitudes $|Y_r|$ supplied to the shift register, whereby T is equal to the duration of the emitted modulated radar transmitter pulse $Y_t$, and provided with a peak detector for determining $f(|Y_r|)$ of the amplitudes of $|Y_r|$ stored in the shift register.

13. Pulse radar apparatus as claimed in claim 1, 2, 3 or 4, characterised in that the pulse radar apparatus comprises quadrature detection means for obtaining an in-phase component $Y_{r,i}$ and an out-of-phase component $Y_{r,q}$ of the received signal $Y_r$, and in that the pulse discriminator is provided with a modulus unit for the generation of $|Y_r|$ on the basis of $Y_{r,i}$ and $Y_{r,q}$.

14. Pulse radar apparatus as claimed in claim 1, 2, 3 or 4, characterised in that the pulse discriminator comprises quadrature detection means for obtaining an in-phase component $\sigma_{xy,i}(\delta)$ and an out-of-phase component $\sigma_{xy,q}(\delta)$ of the correlation signal $\sigma_{xy}(\delta)$, and in that the pulse discriminator is provided with a modulus unit for the generation of $|\sigma_{xy}(\delta)|$ on the basis of $\sigma_{xy,i}(\delta)$ and $\sigma_{xy,q}(\delta)$.

15. Pulse radar apparatus as claimed in claim 12, characterised in that the pulse discriminator is provided with an edge detector, connected to the peak detector output for determining the occurrence of an edge in signals, generated by the peak detector.

* * * * *